UNITED STATES PATENT OFFICE 2,773,894
Patented Dec. 11, 1956

2,773,894

DI-CYCLOHEXYL ETHANE COMPOUNDS, AND A PROCESS OF MAKING SAME

Erich M. H. Radde, New York, N. Y.

No Drawing. Application November 20, 1953,
Serial No. 393,504

Claims priority, application Germany December 2, 1949

5 Claims. (Cl. 260—488)

This invention relates to dicyclohexyl ethane compounds, and more particularly to dicyclohexyl ethane compounds substituted by alkyl residues, and a method of producing same.

The present invention is a continuation-in-part application of my co-pending application Serial No. 193,275, filed October 31, 1950, relating to "Dicyclohexyl ethane compounds and a method of making same," now Patent No. 2,661,369 of December 1, 1953. Said co-pending application refers to (p-cyclohexenonyl)-(p-hydroxy aceto cyclohexanyl)-diethyl ethane compounds of the following formula

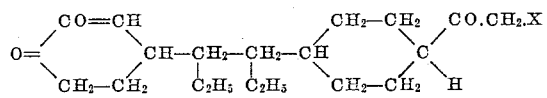

wherein X represents a member selected from the group consisting of a hydroxyl group and an acyloxy group.

It is one object of this invention to provide new chemical compounds of the following formula

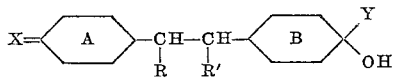

wherein R and R' are alkyl radicals, especially ethyl radicals, while X represents a keto or a secondary alcohol group or a group convertible by hydrolysis into said keto or secondary alcohol group, Y a side chain of the following formula —CO—CH₂R" wherein R" is a hydroxyl group or a group convertible by hydrolysis therein. The cyclohexyl nuclei A and B may be saturated but they may also contain a double bond.

A further object of this invention is to provide methods for producing said compounds by using compounds of the following formula as starting materials:

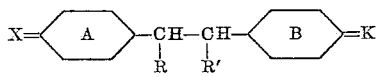

wherein X is a keto or a secondary alcohol group or a group convertible by hydrolysis into said groups and R and R' indicate the same groups as stated above while K is a keto group. Rings A and/or B may contain double bonds. Such starting materials are described, for instance, in French Patent 872,058 which relates to hydroxy ketones or diketones respectively of dicyclohexane dialkyl ethane compounds which are derived from the corresponding dialkyl stilbestrol compounds.

Other objects of this invention will be apparent from the specification and the claims attached thereto.

Compounds having the activity of adrenocortical hormones may be produced by saponifying, for instance, the cyanohydrin obtained on reacting (p-acyloxycyclohexanyl) (p-cyclohexanonyl) diethyl ethanes with hydrocyanic acid, to the corresponding carboxylic acid, protecting the secondary hydroxyl group in the one cyclohexane ring against the action of the subsequently used reagents, for instance, by acylation, transforming said carboxylic acid into the acid halogenide, especially into the acid chloride, reacting said acid halogenide with diazomethane, decomposing the diazoketone obtained to a hydroxy acetocyclohexane compound, transforming the secondary alcohol group in the other cyclohexane ring into the keto group and establishing, if required, a double bond in said ring by bromination and splitting off of hydrogen bromide.

This reaction may be illustrated by the following formulas whereby A and B have the same meaning as stated above while A' is a cyclohexene ring of the following structure:

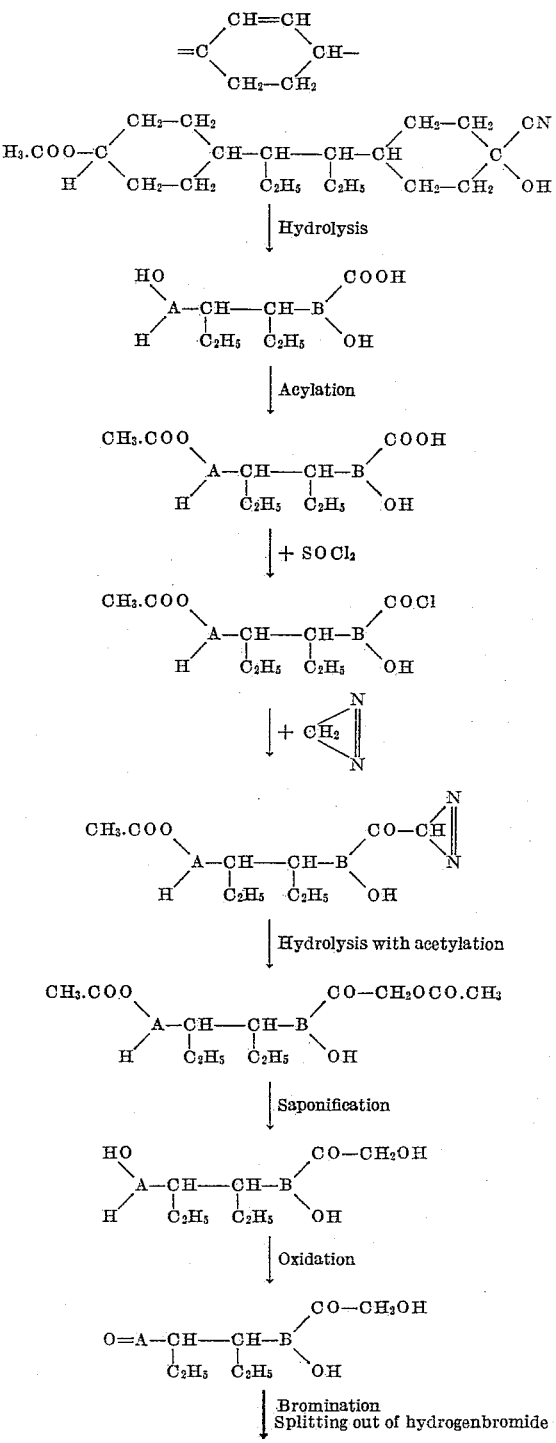

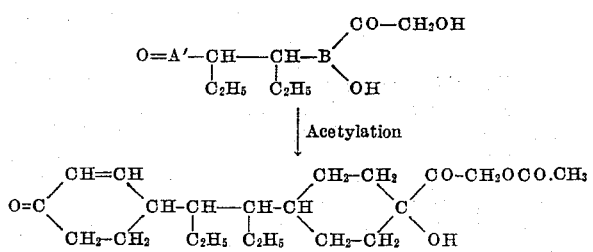

As can be seen from the foregoing, the present invention consists in principle in subjecting the starting material which has one free keto group to reactions as they are known to the art and especially in steroid hormone chemistry, whereby side chains are introduced into the molecule, said side chains corresponding in structure to the side chains present in said steroid hormones.

The new $\alpha,\beta$-substituted diethyl ethane compounds obtained according to the present invention correspond to the following formula

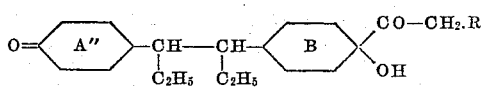

wherein R is a member selected from the group consisting of a hydroxyl group and an acyloxy group and wherein ring A″ is a ring selected from the group consisting of the cyclohexane ring and the cyclohexene ring, while ring B is the cyclohexane ring.

The following example serves to illustrate the invention, without, however, limiting the same thereto.

*Example*

25 g. of (p-acetoxy cyclohexanyl) (p-cyclohexanonyl) diethyl ethane obtained, for instance, according to French Patent 872,058, Examples 8 or 10, are heated with 100 g. of anhydrous hydrocyanic acid in an autoclave for about 4 hours at 50° C. Thereafter the unreacted hydrocyanic acid is evaporated and the cyanohydrin obtained is purified by recrystallisation from ethanol.

10 g. of said cyanohydrin are heated with 50 cc. of a solution of 3.0 g. sodium hydroxide in ethanol and 50 cc. of water in a sealed glass tube for 2 hours at 180° C., the reaction mixture is poured into water, acidified with dilute sulfuric acid, and the precipitated hydroxy carboxylic acid is separated.

10 g. of said acid are then allowed to stand at 20° C. with 40 cc. of dry pyridin and 40 cc. of acetic acid anhydride for 24 hours, the reaction mixture is poured in water, the precipitated monoacetate is washed with water, and is several times recrystallized from alcohol.

5 g. of said acid are boiled under reflux in 25 cc. of anhydrous benzene with 25 cc. of purest thionyl chloride for 3 hours, whereby care is taken that moisture is excluded. Thereafter the benzene as well as the excess of thionyl chloride are distilled off in a vacuum.

The remaining acid chloride is dissolved in 50 cc. of anhydrous ether and the solution is poured into 50 cc. of an anhydrous ethereal diazomethane solution containing 5 g. of freshly prepared diazomethane, said solution being cooled to $-10°$ C. Within the next 2 hours the temperature is gradually raised to room temperature and the solution is allowed to stand over night. After filtration, the filtrate is evaporated almost to dryness in vacuo and the diazoketone formed is precipitated from its concentrated ethereal solution by the addition of petrol ether.

The precipitated diazoketone is then dissolved in 100 cc. of methanol and the solution mixed with 50 cc. of a 5% methanolic potassium hydroxide solution. The mixture is allowed to stand over night, water is added, the methanol is evaporated in vacuo, and the remaining saponified diazoketone is dissolved in ether. After drying the ethereal solution, the ether is removed by evaporation from a water bath and finally by vacuum distillation.

The diazoketone is then heated with 20 cc. of glacial acetic acid to 90° C., until no more nitrogen is developed. On cooling the corresponding hydroxy ketone is obtained.

2 g. of the same are allowed to stand over night with a solution of 1.5 g. of chromium trioxide in 95 cc. of glacial acetic acid and 5 cc. of water. The reaction mixture is poured into much water and is extracted several times with ether.

The (acetoxy acetocyclohexanolyl) (cyclohexanonyl) diethyl ethane obtained after evaporation of the ether is then dissolved in 30 times its amount of chloroform. Said compound corresponds to the following formula:

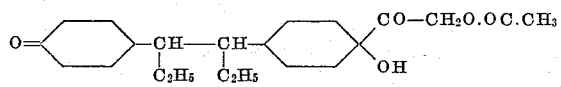

On hydrolysis, the corresponding (p-cyclohexanonyl)-(p-hydroxy aceto cyclohexanolyl) diethyl ethane of the formula

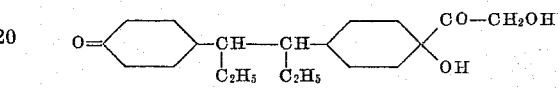

is obtained.

To said solution a solution of bromine in chloroform is added drop by drop while stirring vigorously and cooling between $-8°$ C. to $-12°$ C. until 1 molecule of bromine has reacted to form the monobromo compound. The chloroform solution is washed with sodium bicarbonate solution and with water until neutral, is dried by means of sodium sulfate, and is subjected to vacuum distillation to remove the chloroform.

The residue is then boiled with 5 times its amount of dry pyridine for about 6 hours. The pyridine is distilled off in vacuum and the residue dissolved in ether. The ethereal solution is washed with dilute sulfuric acid, with sodium bicarbonate solution, and with water until neutral, and is dried with sodium sulfate. The ether is distilled off and the residue is purified by fractional distillation in a high vacuum. The resulting (cyclohexenonyl)(acetoxy-acetocyclohexanolyl) diethyl ethane of the formula

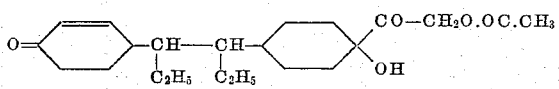

has a corticosterone-like activity.

On hydrolysis, the corresponding (p-cyclohexenonyl)-(p-hydroxy aceto cyclohexanolyl) diethyl ethane of the formula

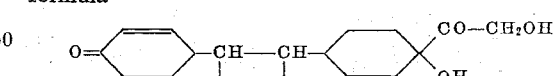

is obtained.

Of course, many changes and variations may be made by those skilled in the art in the reaction conditions, the reagents used, the methods of purifying the reaction products, and the like, in accordance with the principles set forth herein and in the claims annexed hereto. Thus, for instance, instead of the acetyl compounds, esters with other acids such as propionic acid, benzoic acid, phosphoric acid, stearic acid and others, or ethers, such as the methyl ether and others may be used as starting or intermediate compounds or may be produced as final products. In general, all those ester and ether residues may be used which are conventionally employed in steroid chemistry for protecting hydroxyl groups or for preparing derivatives of the free hydroxy compounds. The oxidation of the secondary alcohol group to the keto group may be carried out with other oxidizing agents instead of chromic acid, such as the permanganate, by the Meerwein-Ponndorf reaction and the like. The double bond in conjugation to the keto group may be introduced by other known means; for instance, splitting out of hydrogen bromide may be effected by means of dimethyl aniline, quinoline, and others. The addition of hydrocyanic acid to the cyclohexanone compound may be carried out in any other known manner. The ketonic intermediate and end products may be purified not only by fractional crystallisation from suitable solvents, but also by converting them into insoluble ketonic condensation products, for instance, with thiosemicarbazide, phenylhydrazine and others, besides those mentioned in the examples. The keto compound may be reformed from said ketonic derivatives not only by hydrolysis by means of acids and the like, but also by reacting said derivatives with other aldehydes or ketones, such as benzaldehyde and others.

What I claim is:

1. An α,β-substituted diethyl ethane compound of the formula

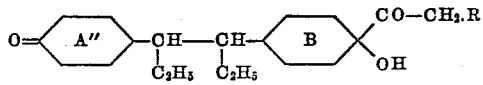

wherein R is a member selected from the group consisting of a hydroxyl group and an acyloxy group and wherein ring A″ is a ring selected from the group consisting of the cyclohexane ring and the cyclohexene ring while ring B is the cyclohexane ring.

2. (p - Cyclohexenonyl) (p-hydroxyaceto cyclohexanolyl) diethyl ethane of the following formula

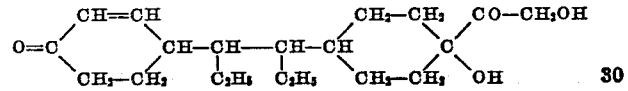

3. (p - Cyclohexenonyl) (p - acetoxyaceto cyclohexanolyl) diethyl ethane of the following formula

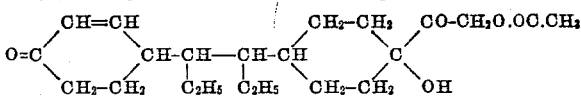

4. (p - Cyclohexanonyl) (p - hydroxyaceto cyclohexanolyl) diethyl ethane of the following formula

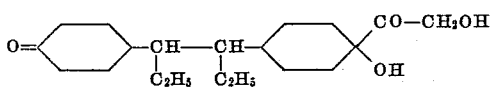

5. (p - Cyclohexanonyl) (p - acetoxyaceto cyclohexanolyl) diethyl ethane of the following formula

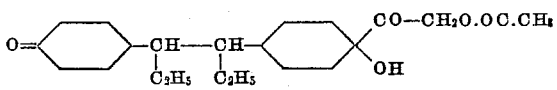

References Cited in the file of this patent
UNITED STATES PATENTS
2,661,369     Radde _____ Dec. 1, 1953